United States Patent
Zafiropoulo et al.

(10) Patent No.: US 9,266,437 B2
(45) Date of Patent: *Feb. 23, 2016

(54) BETAVOLTAIC POWER SOURCES FOR TRANSPORTATION APPLICATIONS

(71) Applicant: Ultratech, Inc., San Jose, CA (US)

(72) Inventors: Arthur W. Zafiropoulo, Atherton, CA (US); Andrew M. Hawryluk, Los Altos, CA (US)

(73) Assignee: Ultratech, Inc., San Jose, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 13/933,355

(22) Filed: Jul. 2, 2013

(65) Prior Publication Data

US 2014/0021826 A1 Jan. 23, 2014

Related U.S. Application Data

(60) Provisional application No. 61/674,781, filed on Jul. 23, 2012.

(51) Int. Cl.
| | |
|---|---|
| *G21H 1/06* | (2006.01) |
| *G21H 1/02* | (2006.01) |
| *B60L 11/18* | (2006.01) |
| *G21H 1/00* | (2006.01) |
| *B60L 11/00* | (2006.01) |

(52) U.S. Cl.
CPC ............... *B60L 11/18* (2013.01); *B60L 11/002* (2013.01); *G21H 1/00* (2013.01); *G21H 1/06* (2013.01)

(58) Field of Classification Search
None
See application file for complete search history.

(56) References Cited

U.S. PATENT DOCUMENTS

| | | | |
|---|---|---|---|
| 3,706,893 | A | 12/1972 | Olsen et al. |
| 5,260,621 | A | 11/1993 | Burke et al. |
| 5,396,141 | A | 3/1995 | Aton et al. |
| 5,440,187 | A | 8/1995 | Burke et al. |
| 5,859,484 | A | 1/1999 | Chu et al. |
| 7,301,254 | B1 | 11/2007 | Lal et al. |
| 7,622,532 | B2 | 11/2009 | Gedekan et al. |
| 7,663,288 | B2 | 2/2010 | Chandrashekhar et al. |
| 7,939,986 | B2 | 5/2011 | Chandrashekhar et al. |
| 8,017,412 | B2 | 9/2011 | Spencer et al. |
| 8,073,097 | B2 | 12/2011 | Harker et al. |

(Continued)

FOREIGN PATENT DOCUMENTS

| | | |
|---|---|---|
| DE | 21 22 171 | 11/1971 |
| GB | 2484028 | 3/2012 |

(Continued)

OTHER PUBLICATIONS

Search Report from Hungarian Intellectual Property Office (outsourced by Intellectual Property Office of Singapore) for Singapore counterpart patent Application No. 201302760-2.

(Continued)

*Primary Examiner* — Tran Nguyen
(74) *Attorney, Agent, or Firm* — Opticus IP Law PLLC (57) ABSTRACT

A betavoltaic power source for transportation devices and applications is disclosed, wherein the device having a stacked configuration of isotope layers and energy conversion layers. The isotope layers have a half-life of between about 0.5 years and about 5 years and generate radiation with energy in the range from about 15 keV to about 200 keV. The betavoltaic power source is configured to provide sufficient power to operate the transportation device over its useful lifetime.

19 Claims, 11 Drawing Sheets

(56) References Cited

U.S. PATENT DOCUMENTS

| | | | |
|---|---|---|---|
| 8,094,771 B2 | 1/2012 | Tsang et al. | |
| 8,134,216 B2 | 3/2012 | Spencer et al. | |
| 8,153,453 B2 | 4/2012 | Spencer et al. | |
| 8,487,392 B2 * | 7/2013 | Spencer | G21H 1/06 257/428 |
| 8,487,507 B1 | 7/2013 | Cabauy | |
| 8,872,408 B2 * | 10/2014 | Zafiropoulo | G21H 1/06 310/303 |
| 2007/0273244 A1 * | 11/2007 | Lal | G21H 1/02 310/311 |
| 2009/0026879 A1 * | 1/2009 | Prelas | G21H 1/06 310/303 |
| 2011/0031572 A1 | 2/2011 | Spencer et al. | |
| 2011/0241144 A1 * | 10/2011 | Spencer | G21H 1/02 257/429 |
| 2011/0291210 A1 * | 12/2011 | Batchelder | G21H 1/06 257/429 |
| 2012/0305241 A1 | 12/2012 | Rytlewski et al. | |
| 2012/0326164 A1 | 12/2012 | Lal | |
| 2013/0033149 A1 * | 2/2013 | Thomas | G21H 1/06 310/303 |

FOREIGN PATENT DOCUMENTS

| | | |
|---|---|---|
| JP | S48-016589 A | 7/1973 |
| JP | 2009-291023 A | 12/2009 |
| WO | WO00/22629 | 4/2000 |
| WO | WO 2011/063228 A2 | 5/2011 |

OTHER PUBLICATIONS

Search Report from Hungarian Intellectual Property Office (outsourced by Intellectual Property Office of Singapore) for Counterpart Singapore patent Application No. 2013005420-0.

Presentation entitled "The BetaBattery™: A long-life, self-recharging battery," Arlington Technology Association, Mar. 3, 2010.

Gadeken, Larry L, Presentation entitled "Tritiated 3D Diode Betavoltaic microbattery," IAEA workshop, Advanced Sensors for Safeguards, Apr. 23-27, 2007.

Honsberg et al., "GaN Betavoltaic Energy Converters," presented at the 31st IEEE Photovoltaics Specialist Conference, Orlando FL Jan. 3-7, 2005.

Raytheon Technology Today, Issue 1, 2011, entitled "Power sources that last a century."

Office Action for German Counterpart Patent Application No. 10 2013 011 499.3, issued by the German Patent Office on May 5, 2014.

Office Action for Japanese Counterpart Patent Application No. 2013-143764, issued by the Japanese Patent Office on Aug. 5, 2015.

Office Action for Taiwan Counterpart Patent Application No. 102126013, issued by the Taiwan Patent Office on Jan. 7, 2015.

* cited by examiner

BETAVOLTAIC POWER SOURCES FOR TRANSPORTATION APPLICATIONS

CROSS-REFERENCE TO RELATED APPLICATIONS

This Application claims priority under 35 USC §119(e) from U.S. Provisional Patent Application Ser. No. 61/674,781, filed on Jul. 23, 2012, and which is incorporated by reference herein.

This application is related to U.S. patent application Ser. No. 13/863,283, filed on Apr. 15, 2013, and which issued as U.S. Pat. No. 8,872,408 on Oct. 28, 2014, and which is incorporated by reference herein.

FIELD

The present disclosure relates generally to power sources, and more generally to betavoltaic power sources for transportation applications.

BACKGROUND ART

The electric car offers society an opportunity to use less fossil fuel for transportation. A significant impediment to the acceptance of electric car transportation is the range of travel available and the charging time required to charge the battery. Ultimately, the driving range is limited by the capacity of the battery stored within the car. The capacity of the battery defines the amount of energy stored, which determines the driving range for most applications.

An example of a typical electric car battery is the lithium-based battery system for the Roadster electric car made by and sold by Tesla Motors. At the time of its development, it was one of the largest and technically most advanced Li-ion battery packs in the world. It had the capability to store sufficient energy to propel the Roadster more than 200 miles without recharging. The battery pack stored about 53 kilowatt hours of electric energy. However, the Roadster is a small vehicle. A replacement to this Li-ion battery would need to store at least as much energy and possibly more.

What is needed is a battery that can generate sufficient power to drive an electric car without charging, or after an extended period of time (such as a year or multiple years), offer simple battery replacement with another long-use battery.

SUMMARY

The present disclosure is directed to betavoltaic power sources for powering transportation devices such as electric cars and other types of electric-powered vehicles. The betavoltaic power source provides continuous operation for a span of time that corresponds to about to the useful lifetime of the transportation device or to a substantial fraction of the useful lifetime. The useful life time can be anywhere from 6 months to 10 years, e.g., 6 months to 5 years.

The present disclosure is directed to a betavoltaic power source for powering electric transportation devices, such as autos, but is not limited singly to autos. Other transportation devices, such as motorcycles, trucks, three and multi-wheeled transportation devices, personal transportation devices (e.g., such those made by Segway, Inc.), golf carts, scooters, etc., are all expected to benefit from this disclosure. The betavoltaic power source is configured to provide continuous operation for a span of time that corresponds to about to the useful lifetime of the transportation device or a substantial fraction of the useful lifetime.

The betavoltaic power sources disclosed herein can be configured to provide a select amount of power suitable for a given electric transportation device that has a useful lifetime. The integration of select isotopes with a stacking (multilayer) architecture of isotope material and energy conversion material provides power levels that are orders of magnitude higher than prior art betavoltaic power sources. The beta particles ("betas"), as well as x-rays and gamma rays ("gammas") are converted into useful electricity to drive transportation devices.

The betavoltaic power source relies upon nuclear reactions associated with isotopes to convert stored energy to electricity. Betavoltaic power sources traditionally work on converting beta (electron) particles to energy using a very long-lived isotope. They are conventionally used for low-power applications, and where accessibility to the device is impractical, such as spacecraft and satellites.

The present betavoltaic device provides an amount of electrical power suitable for transportation devices. The integration of select isotopes with a stacking (multilayer) architecture of isotope material and energy conversion material provides power levels that are orders of magnitude higher than prior art betavoltaic power sources. The beta particles, as well as x-ray and gamma rays, as converted into useful electricity to drive transportation devices.

An aspect of the disclosure is a betavoltaic power source for a transportation device having a useful lifetime. The source includes a plurality of isotope layers, with each isotope layer comprising an isotope material that emits radiation as either beta particles, x-rays or gamma rays having an amount of energy that is greater than about 15 keV and less than about 200 keV, and a half-life that is between about 0.5 years and about 5 years. The source also includes a plurality of energy conversion layers interposed between some or all the isotope layers and that receive and convert the energy from the radiation into electrical energy sufficient to power the transportation device over the useful lifetime.

Another aspect of the disclosure is the betavoltaic power source as described above, wherein the energy conversion layers comprise GaN.

Another aspect of the disclosure is the betavoltaic power source as described above, wherein the energy conversion layers each have a thickness of about 10 microns to 20 microns.

Another aspect of the disclosure is the betavoltaic power source as described above, wherein the isotope material is selected from the group of isotope materials comprising: (3)H, (194)Os, (171)Tm, (179)Ta, (109)Cd, (68)Ge, (139)Ce, and (181)W.

Another aspect of the disclosure is the betavoltaic power source as described above, and further including a radiation-absorbing shield operably arranged to substantially prevent the beta particles, x-rays and gamma rays from exiting the betavoltaic power source.

Another aspect of the disclosure is the betavoltaic power source as described above, wherein adjacent isotope and energy conversion layers define layer pairs and wherein the betavoltaic power source includes between 500 and 10,000 layer pairs.

Another aspect of the disclosure is the betavoltaic power source as described above, wherein the isotope layers are formed from the same isotope material.

Another aspect of the disclosure is the betavoltaic power source as described above, wherein the amount of electrical energy is at least 100 watts.

Another aspect of the disclosure is the betavoltaic power source as described above, and further including cooling conduits that remove heat from the isotope and energy conversion layers.

Another aspect of the disclosure is the betavoltaic power source as described above, and further comprising the transportation device electrically connected to the betavoltaic power source.

Another aspect of the disclosure is a betavoltaic power source for a transportation device having a useful lifetime. The source includes a plurality of isotope layers, with each isotope layer comprising an isotope material that emits radiation having an amount of energy that is greater than about 15 keV and less than about 200 keV, and a half-life that is between about 0.5 years and about 5 years. The source also includes a plurality of energy conversion layers interposed between some or all the isotope layers and that receive and convert the energy from the radiation into electrical power of no less than 100 watts to power the transportation device over a useful lifetime of between 0.5 years and 5 years.

Another aspect of the disclosure is the betavoltaic power source as described above, wherein one or more of the energy conversion layers have a diode structure.

Another aspect of the disclosure is the betavoltaic power source as described above, wherein the diode structure includes either GaN or Ge.

Another aspect of the disclosure is the betavoltaic power source as described above, wherein the Ge comprises (68)Ge.

Another aspect of the disclosure is the betavoltaic power source as described above, wherein adjacent isotope and energy conversion layers define layer pairs, and wherein the betavoltaic power source includes between 500 and 10,000 layer pairs.

Another aspect of the disclosure is the betavoltaic power source as described above, wherein the isotope layers are formed from first and second isotopes having different half-lives.

Another aspect of the disclosure is the betavoltaic power source as described above, wherein the isotope layers are formed from same isotope material.

Another aspect of the disclosure is the betavoltaic power source as described above, wherein the radiation includes at least one of beta particles, x-rays and gamma rays.

Another aspect of the disclosure is the betavoltaic power source as described above, and further including the transportation device.

Another aspect of the disclosure is the betavoltaic power source as described above, and further including a conventional battery electrically connected to the betavoltaic power source.

It is to be understood that both the foregoing general description and the following detailed description presented below are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The abbreviation "mw" as used herein means "milliwatts."

Isotopes are denoted herein as (x)y, with x being the mass number and y the element symbol.

The term "radiation" is used herein in the context of radioactivity of an isotope and includes both emitted particles and electromagnetic waves.

The term "betavoltaic" as used herein is not limited to beta particles, and includes other non-beta radiation, such as gamma rays and x-rays. Thus, the term "betavoltaic power source" as used herein is synonymous with "isotope-based power source," since these two terms are often used synonymously in the art.

Any patent application or publication cited herein is incorporated herein by reference, including the following U.S. patents, patent publication, and published articles and presentations: U.S. Pat. No. 7,301,254; U.S. Pat. No. 7,622,532; U.S. Pat. No. 7,663,288; U.S. Pat. No. 7,939,986; U.S. Pat. No. 8,017,412; U.S. Pat. No. 8,134,216; U.S. Pat. No. 8,153,453; 2011/0031572; Hornsberg et al., "GaN betavoltaic energy converters," 0-7803-8707-4/05, 2005 IEEE; Presentation by the Arlington Technology Association, entitled "The BetaBattery™—A long-life, self-recharging battery," Mar. 3, 2010; The presentation by Larry L. Gadekan, "Tritiated 3D diode betavoltaic microbattery," IAEA advanced Workshop, Advanced Sensors for Safeguards, 23-27 Apr. 2007.

The present disclosure is directed to betavoltaic power sources for transportation devices and applications. There are certain types of power sources that utilize isotopes wherein one or more thin layers of isotope material (isotope layer) is/are surrounded by an energy conversion material (energy conversion layer). The energy conversion layer acts like a generator. In general, it receives radiation from the isotope and converts the energy of the radiation into useful electricity, i.e., an amount of electric current that represents a corresponding amount of electrical power.

Figure 1:
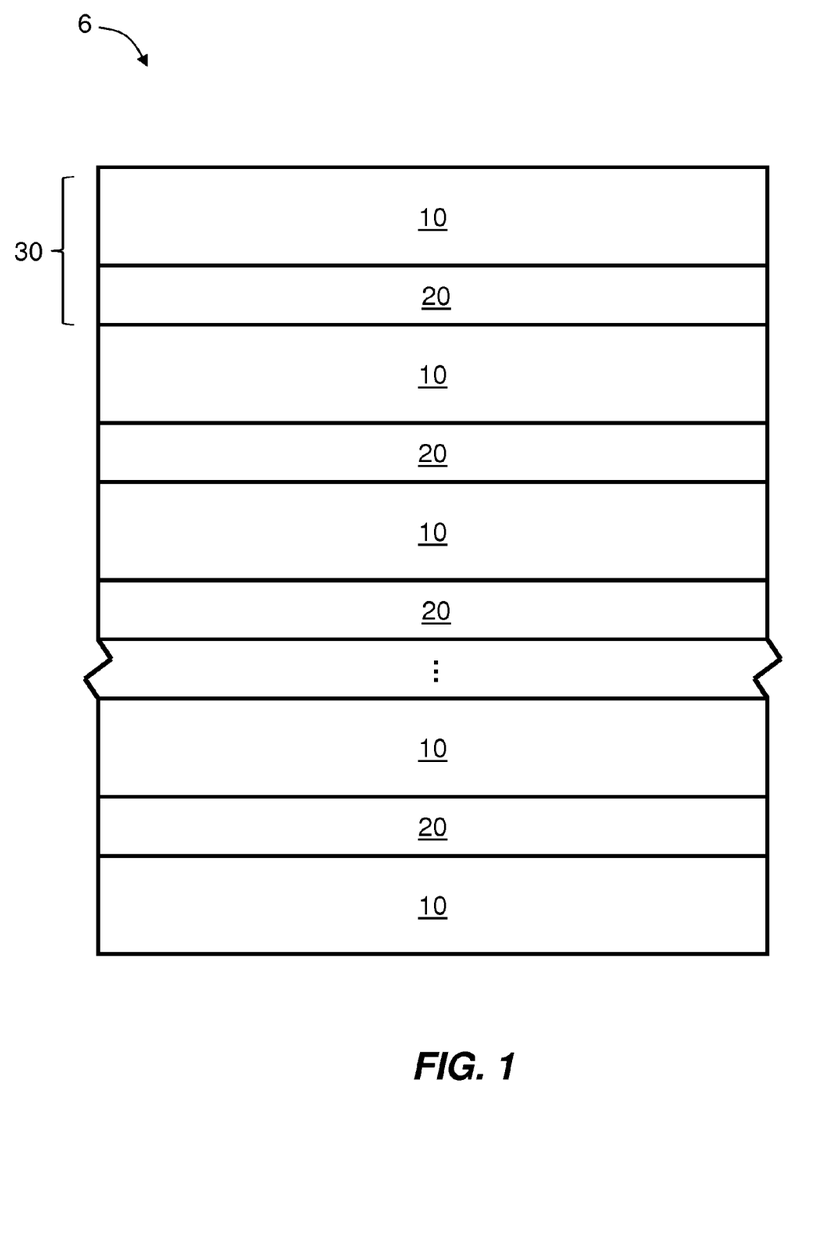
FIGS. 1, 2, 3, 4A and 4B are schematic diagrams of example embodiments of the betavoltaic power source of the present disclosure.

FIG. 1 is a schematic diagram of an example betavoltaic power source 6 that has a stacked structure defined by energy conversion layers (films) 10 and isotope layers (films) 20. The energy conversion layers 10 are interposed between some or all of the isotope layers 20. In an example such as shown in FIG. 1, the stacked structure includes alternating energy conversion layers 10 and isotope layers 20.

In an example, the material making up energy conversion layers 10 includes or consists of GaN, while the material making up isotope layers 20 includes or consists of (179)Ta. Thus, in an example embodiment, betavoltaic power source 6 has a stacked structure defined by GaN/(179)Ta/GaN/(179)Ta/GaN/(179)Ta/ . . . /GaN, with each energy conversion layer 10 being approximately 10 microns to 20 microns thick. Thus, in an example, the stacked structure of betavoltaic power source 6 is defined by a sequence of alternating "layer-pairs" 30 of layers 10 and 20.

The specific design of betavoltaic power source 6 disclosed herein is based on a number of basic requirements for a powering a transportation device:
1) A life time that is comparable to (and perhaps a little longer than) the lifetime of the transportation device;
2) Sufficient average power generation to meet consumer needs; and
3) Environmentally safe and consumer friendly, i.e., does not emit radiation that is harmful to humans, the environment or to any adjacent electronics.

Isotopes have a known half-life. In addition, the emission from the decay process is generally known. The emission from decaying isotopes generally falls into the following categories:
1) Gamma radiation (gammas): This is radiation whose source is the nucleus of the atom. The energy of the radiation is measured in keV.
2) X-ray radiation: This is radiation whose source is the electrons surrounding the atom. The energy of the radiation is measured in keV.
3) Beta emission (betas): A "beta" is an ejected electron from the atom. The energy of the electron is measured in keV.
4) Alpha emission (alphas): An "alpha" particle is an ejected helium atom. The energy of the "alpha" particles is measured in keV.

Note that gamma radiation and x-ray radiation is essentially the same (both are electromagnetic radiation), except that the source of the radiation is different. Gammas come from the nucleus of an atom and x-rays come from the orbiting electrons of an atom.

The example betavoltaic power sources 6 disclosed herein converts at least one of betas, gammas and x-rays into useful energy, and in particular into electrical energy. In an example, GaN-type or Ge-type energy conversion layers 10 are used. In an example, energy conversion layers 10 of different materials are used. Also in an example, different isotope layers 20 are used.

The power created by a betavoltaic power source 6 is proportional to the number of emitted particles per unit time from the isotope, which in turn depends upon the number of isotope atoms and the half-life of the isotope. When the isotope layer is "fully converted" (i.e., is undiluted by the presence of other materials), then the energy stored in the isotope layer is maximized.

The only way to increase the power created by a betavoltaic power source 6 is to decrease the half-life of the isotope, thereby increasing the number of emitted particles per unit time, since the number of source atoms in the isotope layer is constant. Therefore, for higher-power and relatively short-lifetime devices (e.g., up to a ten years or just a few years, or just a few months, and not tens of years), isotopes having correspondingly shorter half-lives are required.

As most consumer transportation devices have a lifetime that can range from a few months to a ten years (with most having a maximum lifetime of just a few years), isotopes with a half-life of similar duration are considered herein, with a specific example half-life being in the range from about 0.5 years to about 5 years. By starting off with an isotope that has a shorter half-life than (63)Ni (and assuming both isotope layers are fully converted), the number of emitted particles per unit time can be increased by the ratio of the half-lives.

Also in an example, the betavoltaic power sources 6 disclosed herein utilize an isotope whose emission would not be hazardous to a user. For gammas and x-ray emissions, example isotopes for use in isotope layer 20 have energies less than approximately 250 keV or even less than 200 keV.

In the betavoltaic power sources 6 disclosed herein, the isotopes can emit betas, x-rays or gammas. Both x-rays and gammas can create hole and electron pairs in GaN material and assist in the energy creation. In an example, more than one type of isotope is used. In an example, at least one of electrons (betas), x-rays and gammas are employed.

Example criteria for the material used for the isotope layers 20 include the following:
1) A short half-life that substantially matches the useful life of the transportation device or application;
2) Emission of the requisite amount of stored energy in order to provide the requisite amount of electrical power during that useful life time.
3) emits betas, gammas or x-rays with energies less than 250 keV.
4) emits betas, gammas and x-rays with energies greater than 15 keV.
5) Does not emit alpha particles.

Criterion 1 above requires extracting all the energy out of the isotope layer 20 in a time that is similar to the useful lifetime of the transportation device. This ensures the maximum power is available from betavoltaic power source 6. Criterion 2 ensures that the transportation device will have sufficient electrical power. Criterion 3 ensures that the emission from the isotope layer 20 can be used effectively without significant harmful side-effects to either the transportation device or to humans. Criterion 4 is to ensure that the emission produces a useful minimum amount of power. Criterion 5 avoids the aforementioned disadvantages of energetic alpha particles.

Another criterion is that the energy conversion layers 10 be made of a III-IV type compound to make the betavoltaic power source 6 radiation-hardened. It is known that silicon devices, with their smaller bandgap, are more prone to damage from high-energy radiation and/or betas, whereas GaN or AlGaN devices are far more damage resistant.

In an example, it is preferred that the isotope material can be artificially created.

The Table below sets forth example isotopes and their half-lives, emission energy and mode of production. Notice that the columns for the emitted species list the maximum energy for that species. Typically, the emission is a continuum. For example, for (179)Ta, the maximum x-ray emission is 65 keV. However, there is a continuum of emission from 6 keV to 65 keV. The lower energy x-rays are particularly useful for creating electricity.

| Isotope | Max half-life (Years) | Max Gamma (keV) | Max x-ray (keV) | Max Beta (keV) | Known Production Modes |
|---|---|---|---|---|---|
| 3H | 12.3 | | | 18.6 | Charged particle and thermal neutron activation |
| (194)Os | 6.0 | 82 | 75 | 87 | Thermal neutron activation |
| (228)Ra | 5.76 | 31 | 19 | 40 | Naturally occurring |
| (155)Eu | 4.76 | 146 | 50 | 252 | Fast and Thermal neutron activation |
| (147)Pm | 2.63 | 197 | 46 | 224 | Fast and Thermal neutron activation |
| (171)Tm | 1.92 | 67 | 61 | 96 | Fast and Thermal neutron activation |
| (172)Hf | 1.87 | 202 | 63 | 284 | Charged particle reaction |
| (179)Ta | 1.82 | 65 | none | 111 | Photon and fast neutron activation |
| (109)Cd | 1.27 | 88 | 25 | 126 | Fast and Thermal neutron activation |
| (106)Ru | 1.02 | None | none | 39.4 | Fission by product |
| (68)Ge | 0.74 | None | 10.4 | 106 | Charged particle reaction |
| (195)Au | 0.51 | 211 | 78 | 226 | Charged particle and fast neutron activation |
| (45)Ca | 0.45 | 12.4 | 4.5 | 257 | Fast and Thermal neutron activation |
| (139)Ce | 0.38 | 166 | 39 | 112 | Fast and Thermal neutron activation |
| (181)W | 0.33 | 152 | 67 | 188 | Fast and Thermal neutron activation |

From the above list of isotopes and the criteria set forth above, the underlined and bold isotopes in the Table are potentially best suited for use as isotope layers 20.

Other isotopes in the above Table may be used under more select circumstances. For example, those isotopes that emit higher-energy betas can still work, but may create more damage in a GaN-based energy conversion layer 10. Isotopes that emit gammas that are very high in energy will require additional shielding. Isotopes that have no known artificial manufacturing process will have limit availability. Isotopes that are a product of fission may also have limited availability.

For transportation devices with expected useful lifetimes of approximately 10 years, it may be desirable to use (3)H for isotope layers 20. Because (3)H (deuterium) is not a solid, in an example embodiment the deuterium isotope layer 20 comprises deuterium combined with another material to make the isotope layer 20 solid.

For transportation devices with a useful lifetime of about 5 years, (194)Os is a desirable isotope choice.

For transportation devices with a useful lifetime of about 2 years, (179)Ta is a desirable isotope choice.

For transportation devices with a useful lifetime of less than 1 year, (68)Ge is a desirable isotope choice.

Thus, all of the isotopes listed above are potentially useful for isotope layers 20, though some will be easier to work with and involve less expense.

Electrical Current and Power Calculations

To assess how much electrical current and electrical power can be generated by betavoltaic power source 6, assume an isotope layer 20 that is a 10 micron thick layer of (179)Ta, with a half-life of 1.82 years. Further assume that 100% of the layer is converted to isotopes. The (179)Ta isotope layer 20 emits 65 keV gammas and 111 keV betas. The betas will be effectively absorbed in 10 to 20 microns of GaN. The absorption length of 65 keV gammas in GaN will be over 100 microns, so that most of the gammas will not be absorbed for the 10 to 20 microns thick GaN layer. The fraction of gammas that are absorbed will add to the production of electrical power.

The estimated number of disintegrations per second from a 10 micron thick layer (and an area of 1 cm$^2$) of (179)Ta is approximately $1 \times 10^{12}$ per second. This is computed from the calculated number of atoms in the film, half of which will disintegrate during the half-life, divided by the half-life in seconds. The number of electron-hole pairs generated in the conversion material is given by:

$$G = (N \cdot E)/E_{ehp}$$

where G is the number of electron-hole pairs generated, N is the number of disintegrations per second, E is the beta particle energy and $E_{ehp}$ is the average energy that it takes to generate an electron-hole-pair.

For $1 \times 10^{12}$ disintegrations per second, about 1 milliamp of current is generated from the 1 cm$^2$ isotope layer 20. Assuming a GaN energy conversion layer 10 that is 10 microns thick, the open circuit voltage is roughly 2.3 volts, which indicates a power production of approximately 2 mw/cm$^2$. While not sufficient to move a car, the device can be scaled so that it can be made sufficient to move a car or other transportation device.

Figure 3:
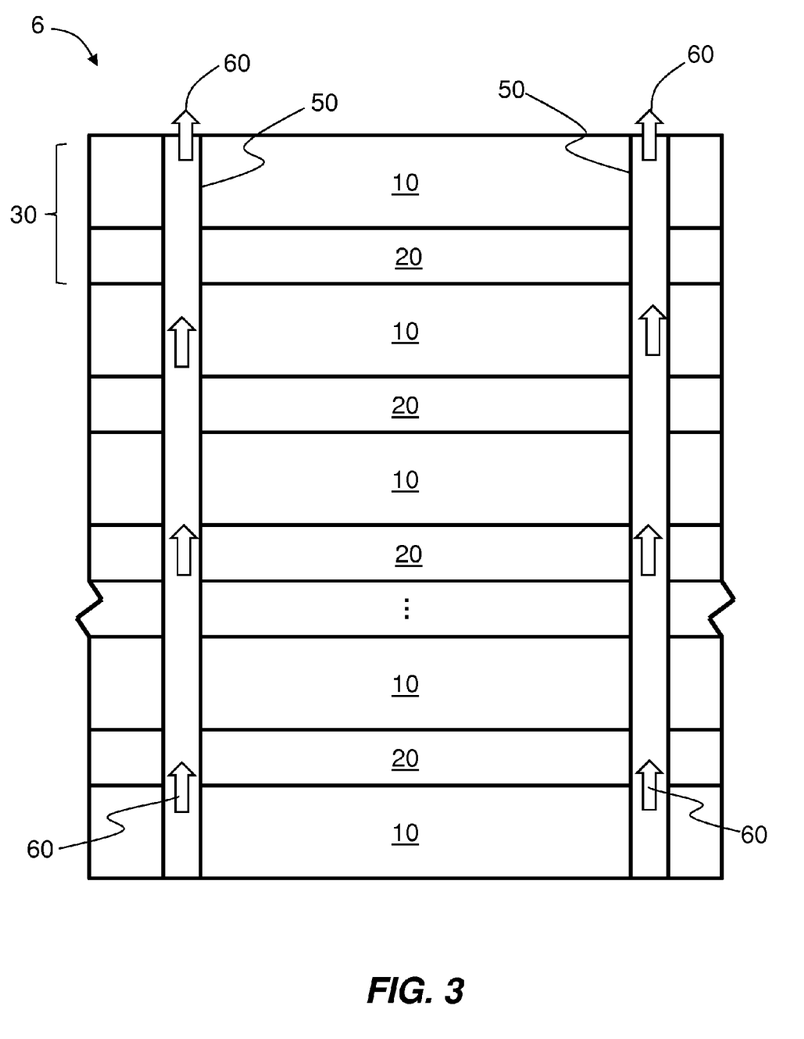

The actual power production will likely be slightly higher than this amount because some of the gammas from isotope layer 20 will be captured by the GaN energy conversion layer 10, and this will assist in the energy production. Approximately 15% of the gammas are less than 10 keV, which will likely be absorbed in the GaN layer These films are thin and can be laid one on top of another to create a layer stack of: GaN/isotope/GaN/isotope/GaN/isotope/ . . . /GaN, as is illustrated in FIG. 3. With each GaN layer of approximately 10 microns thick (the actual thickness will depend upon the efficient capture of the beta-particle for a particular isotope; typically about 10 microns would be sufficient to capture most of the 111 keV betas emitted from 179 Ta), a sequence of alternating "layer-pairs" of GaN/(179)Ta can be created. An example betavoltaic power source for transportation use can include hundreds to tens of thousands of layers.

With each layer of Ta being 10 microns, and each layer of GaN being 10 microns, a structure with 500 layer-pairs in a 1 cm thick device can be constructed. With each layer creating 2 mw/cm$^2$, the 500 layer-pairs will generate 1 watt/cm$^2$ of power. In an auto transportation, we can image a volume that is 100 cm long, 30 cm wide and 10 cm high. The cross sectional area is 3000 cm$^2$, and a 10 cm high package will have 5000 layer pairs. A fuel cell constructed with these dimensions can generate:

(2 mw/cm$^2$/layer-pair)·(3000 cm$^2$)·(5000 layer-pairs)=30,000 watts.

To compare this with the battery from the Tesla Roadster, that battery stores 53 kilowatt-hours of power and has a range of 200 miles. Assuming that the car travels 200 miles in approximately 3 hours, the car is consuming 18 kilowatts. A betavoltaic fuel cell that can generate 30 kilowatts would be sufficient to power the car without the need for recharging.

The actual thickness of energy conversion layer 10 depends upon its efficiency in capturing the particles from isotope layer 20. Typically, a thickness of about 10 microns for energy conversion layer 10 made of GaN would be sufficient to capture most of the 111 keV betas emitted from an isotope layer 20 made of (179)Ta.

Radiation-Absorbing Shield

Figure 2:
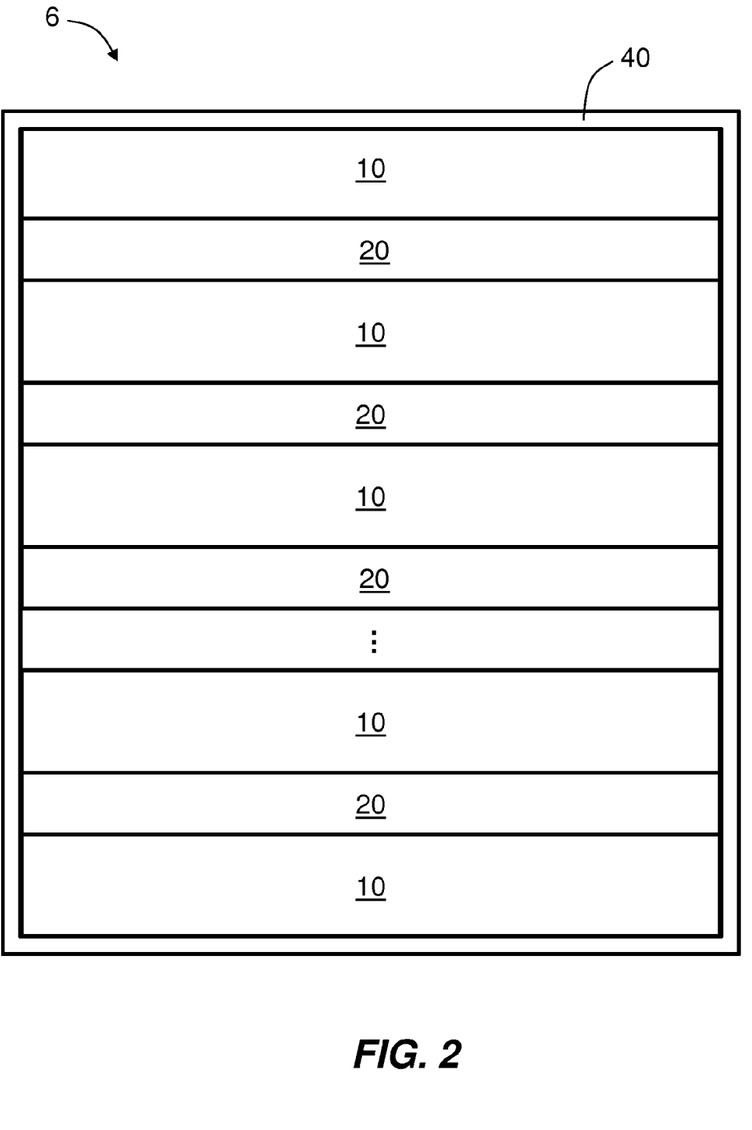

Depending upon the particular isotope(s) used for isotope layers 20, it may be necessary to encase at least a portion the betavoltaic power source 6 in a radiation-absorbing material. FIG. 2 shows the betavoltaic power source 6 of FIG. 1 encased in radiation-absorbing shield 40 made of a radiation-absorbing material. An example radiation-absorbing material is stainless steel.

The thickness of the radiation-absorbing walls of shield 40 depends upon the type of radiation-absorbing material being used, as well as the energy of the radiation emitted by the isotope layers 20. For example, for isotope layers 20 made from (179)Ta, the gamma emission peaks at 65 keV. In the stacked configuration of betavoltaic power source 6 of FIGS. 1 and 2, the gammas generated near the center of the stack will be absorbed by energy conversion layers 10 and isotope layers 20 before they can exit the stacked structure. However, consumers and/or other electronics will need to be substantially shielded from the gammas emitted near the edges of the stacked structure. Thus, in an example, shield 40 has walls that are 1 mm thick and made of stainless steel, which is sufficient to block the 65 keV gamma rays produced by isotope layers 20 made from (179)Ta.

In an example where betavoltaic power source 6 is powered primarily with isotope layers 20 made of (3)H (tritium), there are no emitted gammas or x-rays, and the betas have an energy upper limit of 18.6 keV. For this example, 10 micron thick GaN energy conversion layers 10 on either side of the (3)H isotope layers 20 is sufficient to act as a shield for the betavoltaic power source 6. Since the lifetime of the (3)H isotope is 12.6 years, the number of particles emitted per unit time is reduced considerably from (179)Ta (approximately 7× slower), and the average energy of betas is about 3× lower. This implies that the average power for such a source will likely be about 20× lower than for the (179)Ta source. Nevertheless, for certain mobile power applications that require low power, such a betavoltaic power source 6 can be useful.

Heat Generation and Cooling

The energy conversion materials used for energy conversion layers 10 (e.g., GaN or AlGaN) are typically between 25-35% efficient. Therefore, an appreciable amount of energy emitted by isotope layers 20 is turned into heat. Consequently, it may be necessary to provide cooling conduits. Both the GaN (or AlGaN) energy conversion layers 10 and the (179)Ta isotope layers 20 have good thermal conductivity. FIG. 3 is similar to FIG. 1 and shows the addition of optional cooling conduits 50 that pass through the stack so that heat 60 generated within the stack can be drawn out of the stack through the cooling conduits 50 and then dissipated. In an example, cooling conduits 50 can be made of a solid material of high thermal conductivity, such as copper.

Application

During the life of betavoltaic power source 6, the emission from the isotope layers 20 will slowly decay. As the half-life of the isotope material is approached, the power generated by the betavoltaic power source 6 will drop to half of its original value. For this reason, it is desirable to configure the betavoltaic power source 6 so that it can generate sufficient power (i.e., enough area and sufficient number of layer pairs) to meet performance requirements at a select future date.

Multiple Isotopes

Figure 4A:
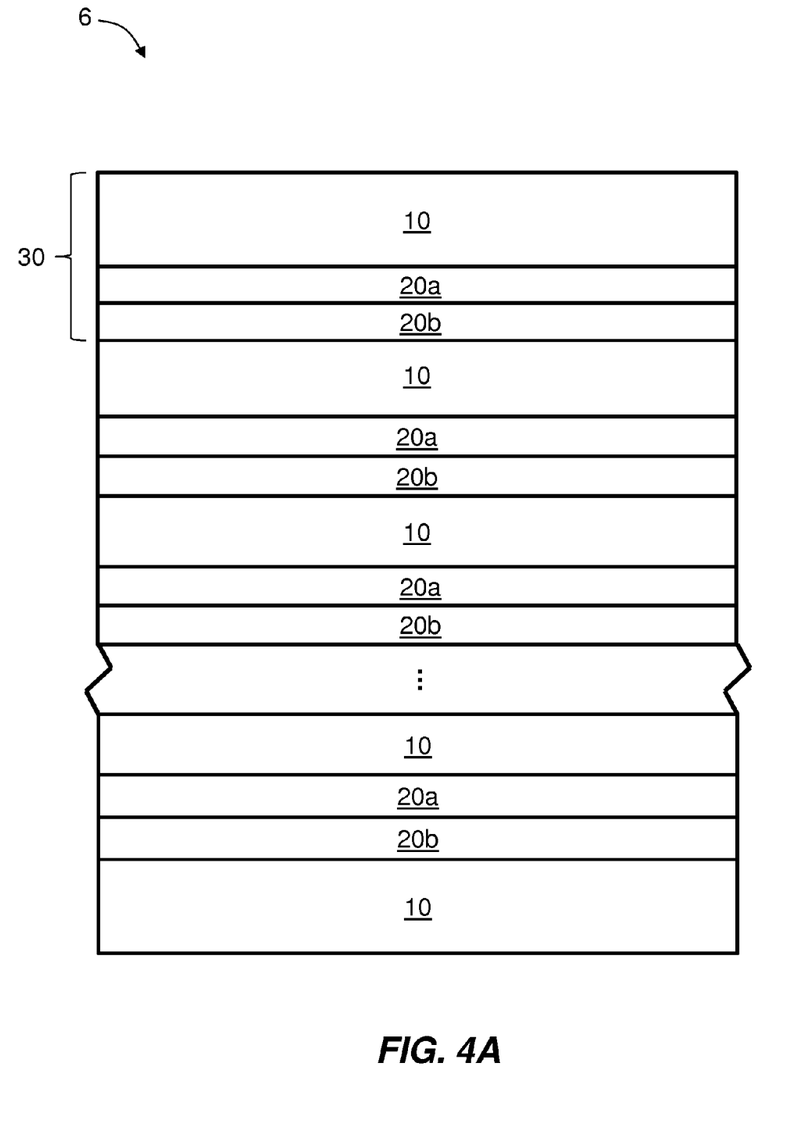

Not all of the isotope layers 20 in betavoltaic power source 6 need to be made of the same isotope material. In an example embodiment of betavoltaic power source 6 illustrated in FIG. 4A, there is more than one type of isotope layer 20, and these different isotope layers are denoted as 20a and 20b. The different layers 20a and 20b as shown in FIG. 4A can thought of as making up a combined isotope layer 20.

Figure 4B:
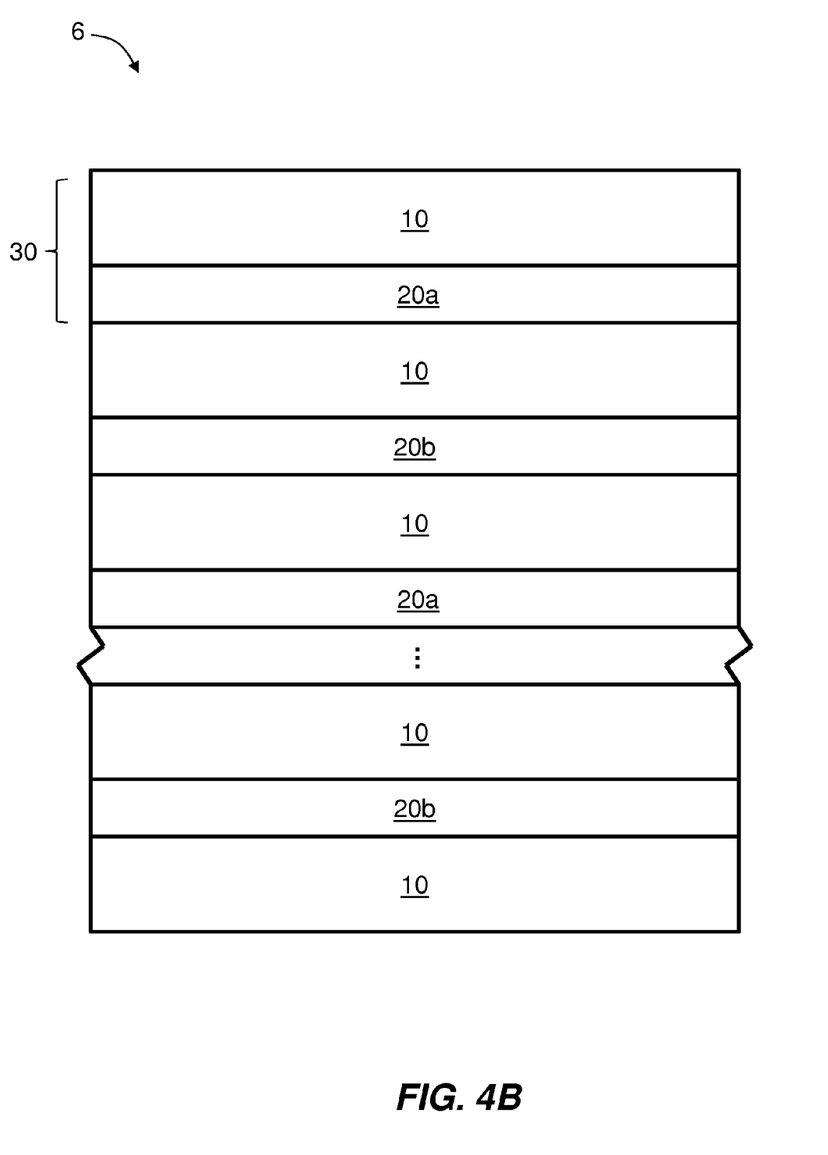

This embodiment for isotope layers 20 may be desirable if the transportation device to be powered requires more power early in its life. For example, if the betavoltaic power source 6 includes 50 layer pairs 30, one could construct half of the isotope layers 20 (say, layers 20a) from (179)Ta, and half of them (say, layers 20b) from (68)Ge. The (68)Ge isotopes will decay more quickly and hence provide more initial power. In this way, one can tailor the energy generation profile vs. time for the particular betavoltaic power source 6. In some examples such as shown in FIG. 4A, the different isotope layers 20a and 20b can reside immediately adjacent each other, i.e., not separated by an energy conversion layer 10. In another example illustrated in FIG. 4B, the isotope layers 20a and 20b alternate in the stacked configuration. In an example embodiment, a combination of the configurations shown in FIGS. 4A and 4B can be used.

Constant Power Generation

Figure 5:
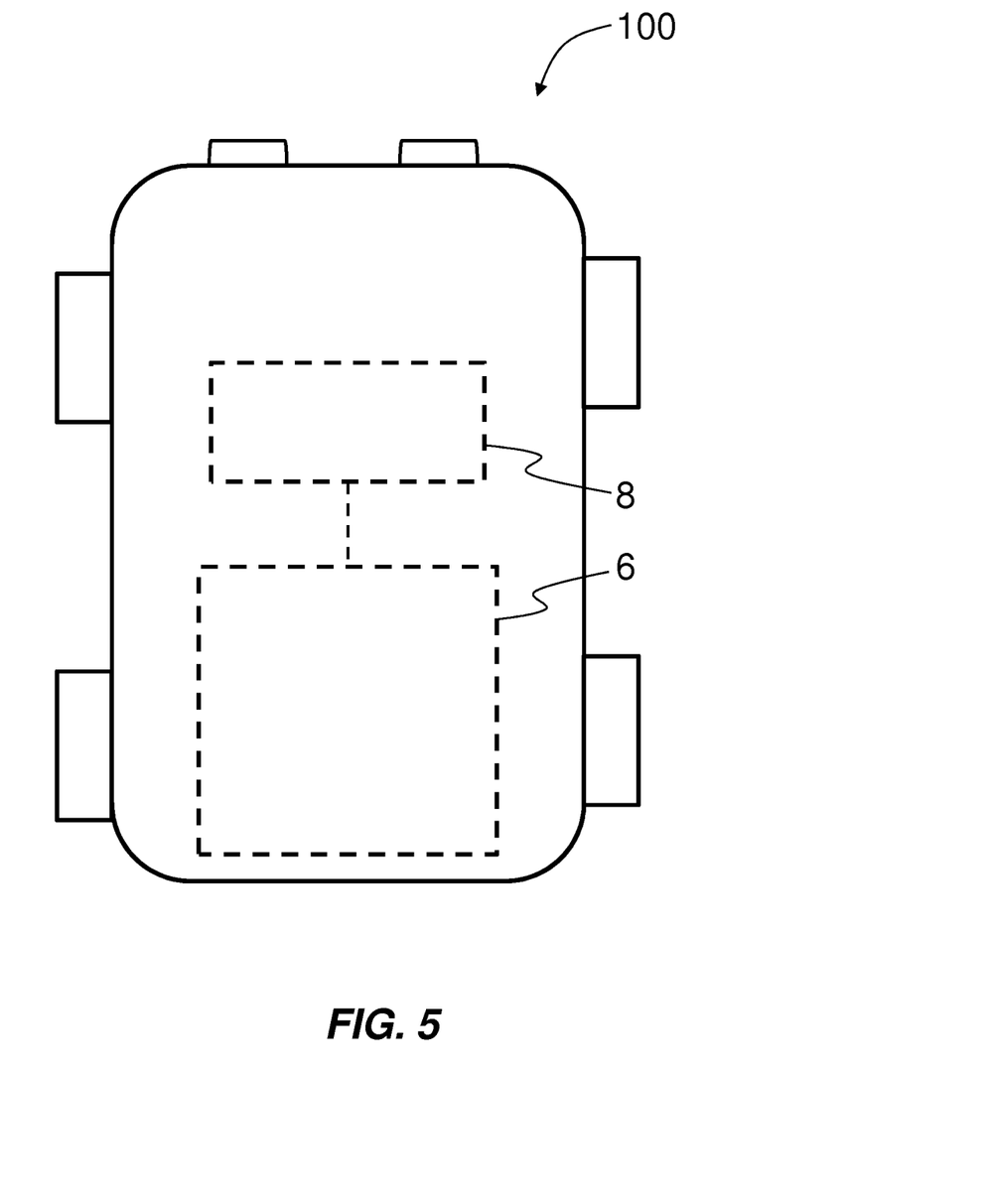
FIG. 5 is a schematic diagram of an example transportation device (e.g., an electric car) that utilizes the betavoltaic power source of the present disclosure, shown along with an optional conventional battery.

A feature of the betavoltaic power source 6 disclosed herein is that it can produce energy 100% of the time, even when the transportation device it powers is not being used. Hence, it becomes possible to generate and store energy for later use even when the transportation device itself is not in use. FIG. 5 discloses the aforementioned transportation device 100 powered by the betavoltaic power source 6 as disclosed herein. The transportation device 100 may also include a conventional battery 8 that electrically connected to and is charged by the betavoltaic power source 6.

Thus, in an example, betavoltaic power source 6 is combined with a traditional electrical source (i.e., a battery) 8 to create a hybrid power source. The hybrid power source allows for generating power when the transportation device is not in use. This may allow for the betavoltaic power source 6 to be made with fewer layers and/or with a smaller area.

Example Energy Conversion Layer

Figure 6A:
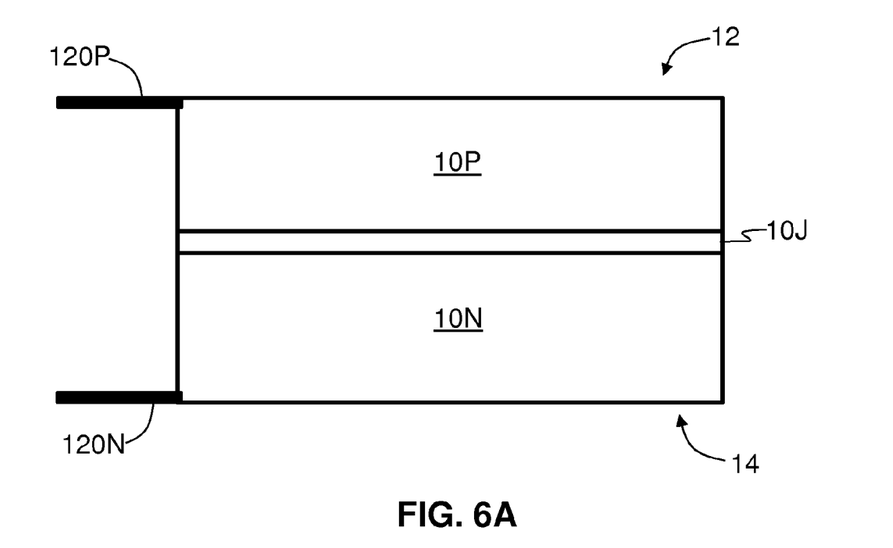
FIGS. 6A and 6B show side and top views, respectively, of an example embodiment of an energy conversion layer formed as a diode.
Figure 6B:
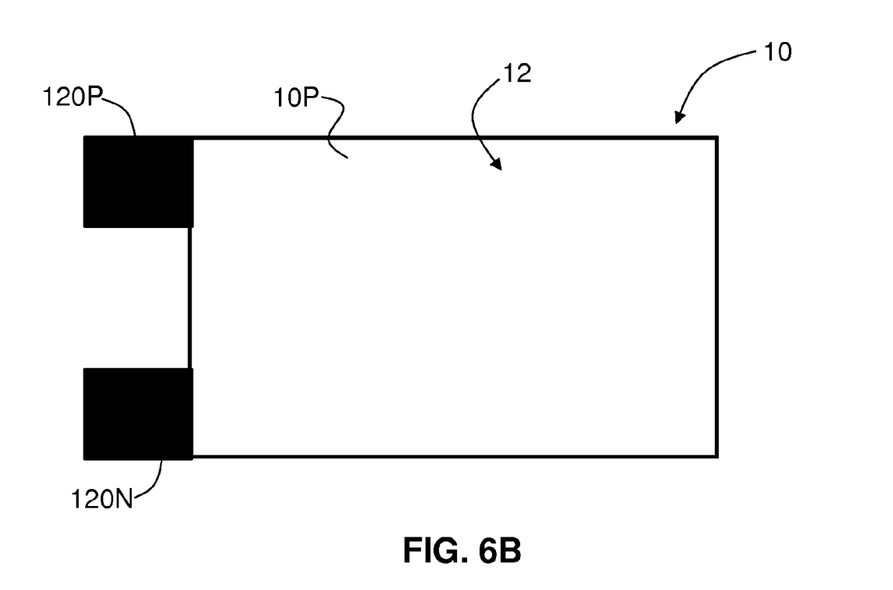

FIGS. 6A and 6B are schematic diagrams (side view and top view, respectively) of an example embodiment of a diode-based energy conversion layer 10 for betavoltaic power source 6. The energy conversion layer 10 has a top 12 and a bottom 14. FIGS. 6A and 6B illustrate an example orientation of positive and negative electrodes 120P and 120N. Energy conversion layer 10 includes a P-doped layer 10P and an N-doped layer 10N separated by a P/N junction layer 10J.

Figure 7A:
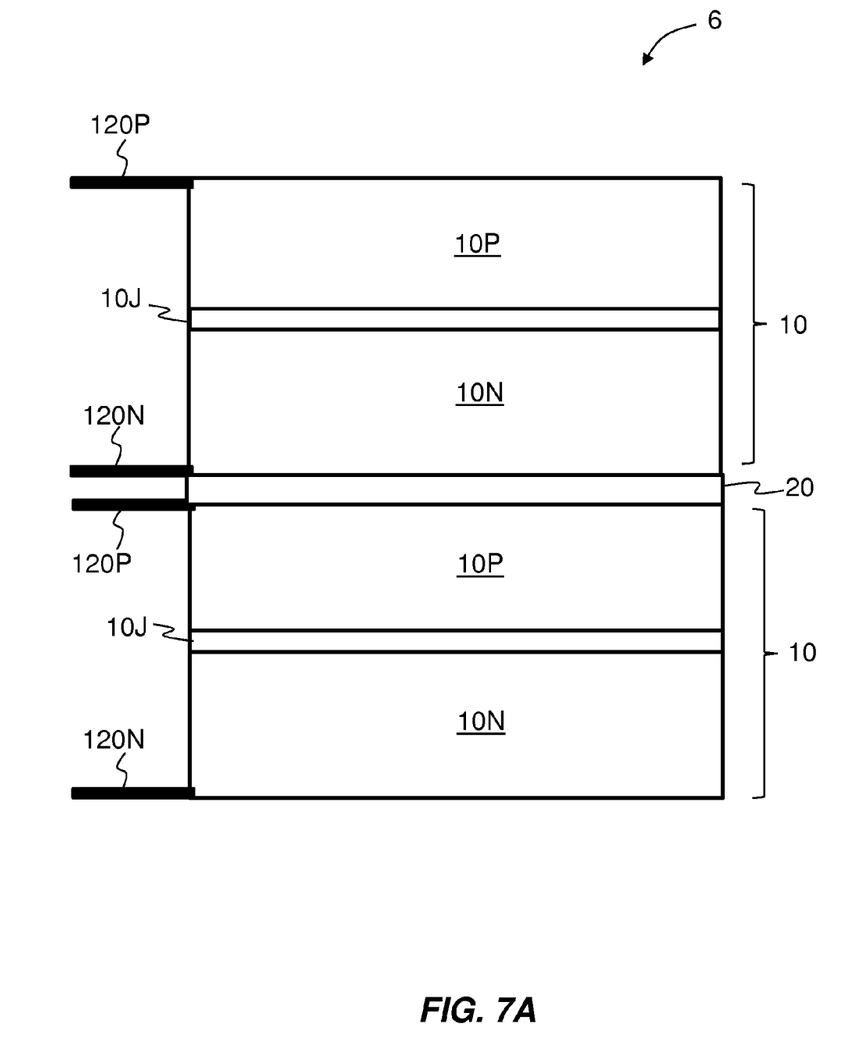
FIG. 7A shows a side view two diode-based energy conversion layers operably arranged relative to the isotope layer.
Figure 7B:
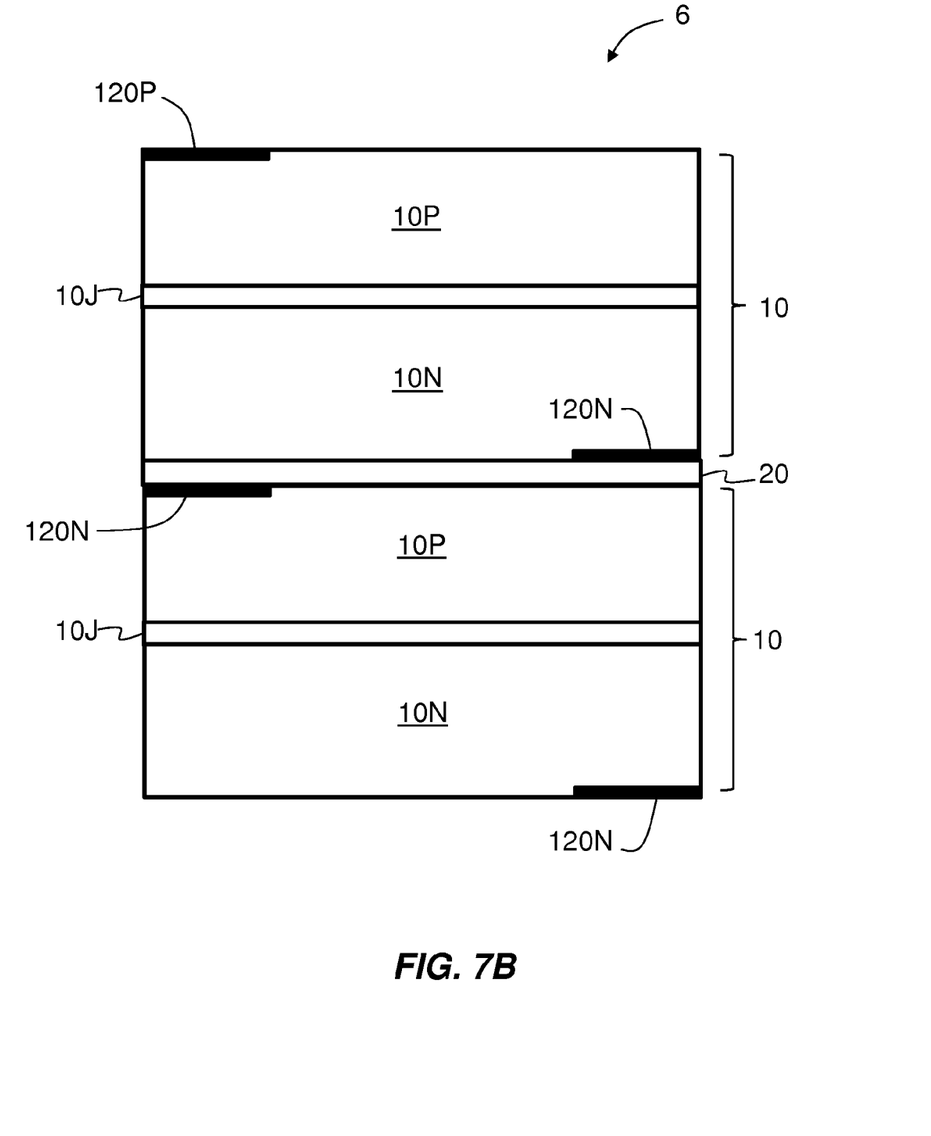
FIG. 7B shows the same device as in FIG. 7A, but rotated 90 degrees to illustrate an example configuration of the electrodes of the diode-based energy conversion layer.
Figure 7C:
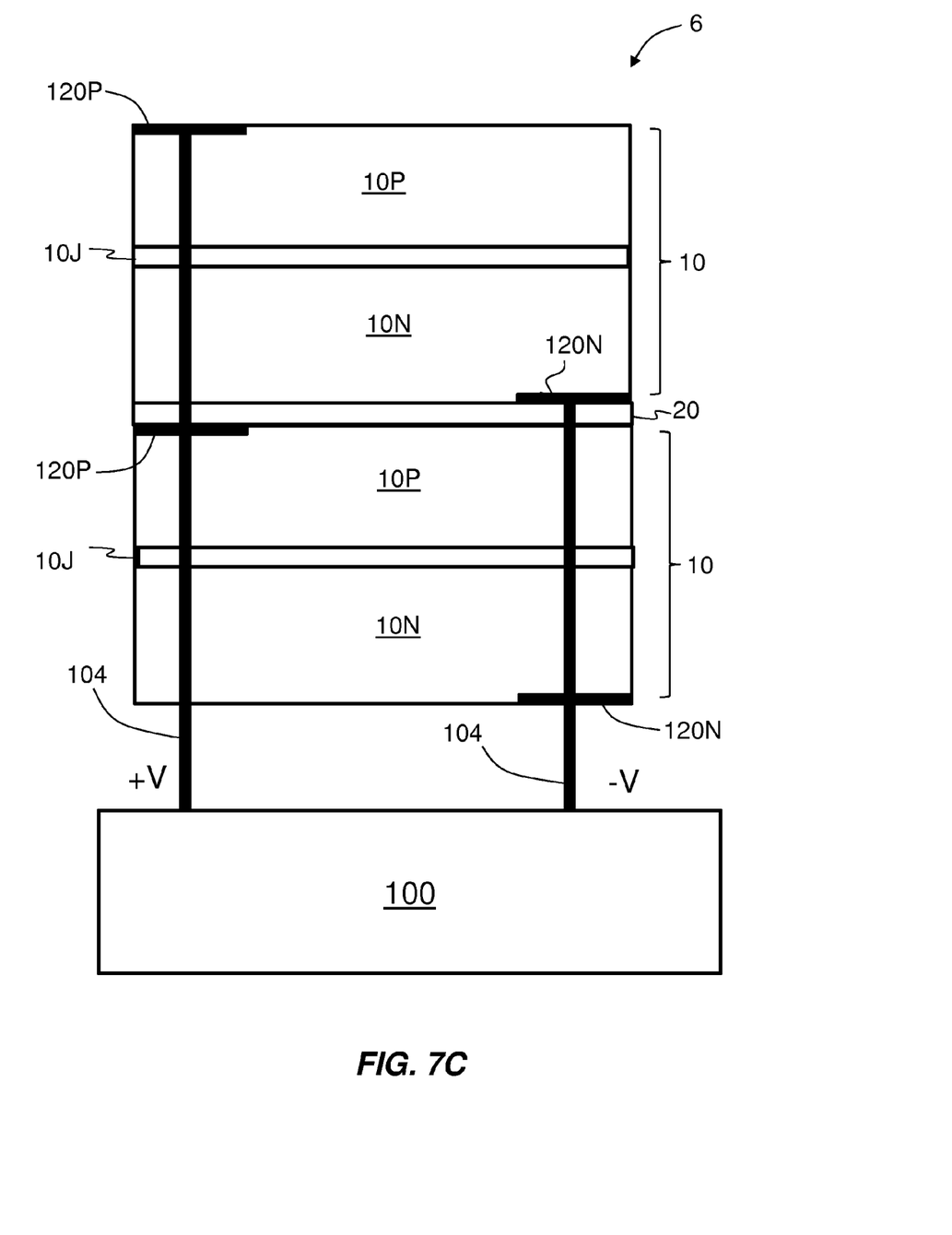
FIG. 7C is similar to FIG. 7B and shows the electrodes electrically connected to an external transportation device.

The positive and negative electrodes 120P and 120N can be positioned to allow for easy integration with isotope layers 20 (e.g., at the top and bottom of energy conversion layer 10 and on the same side, but offset, as shown). FIGS. 7A and 7B are respective side views that illustrate an example embodiment of a betavoltaic power source 6 having a multilayer stack configuration. FIG. 7C is a side view of the betavoltaic power source 6 as shown electrically connected via electrical leads (wires) 104 to external device, such as conventional battery 8 or transportation device 100. The plus voltage "+V" and the minus voltage "−V" are also shown with respect to leads 104.

Energy Conversion Layer that Includes Ge

It should also be noted that energy conversion layers 10 can include or consist of Ge. Efficient Ge solar cells have been made and are similar to the device architecture needed for betavoltaic power source 6. In an example, the Ge material for energy conversion layers 10 can be (68)Ge, thereby making the energy conversion layer 10 itself a source of both beta electrons and x-rays. In this way, space can be conserved, and more power can be generated.

Figure 8:
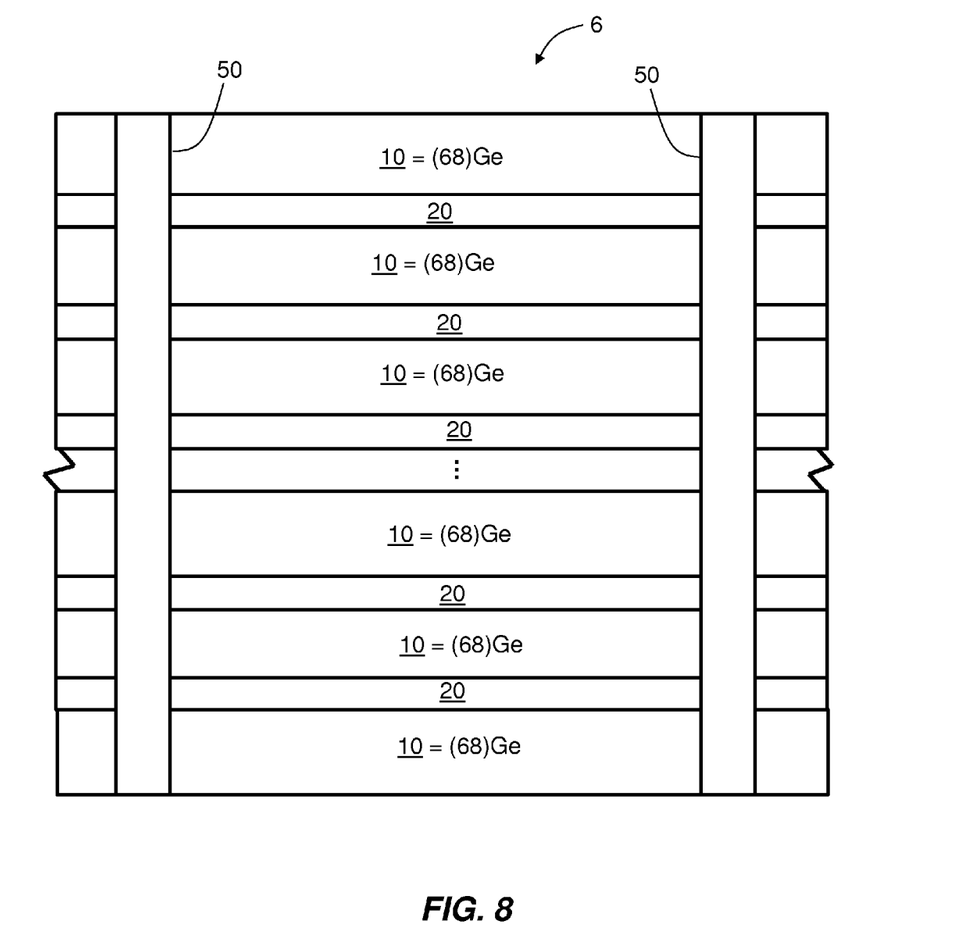
FIG. 8 is similar to FIG. 3 and illustrates the use of (68)Ge as the energy conversion layer in the betavoltaic power source.

FIG. 8 illustrates an example betavoltaic power source 6 made from alternating layers of (68)Ge. Such a configuration can be used for applications where the lifetime of the (68)Ge is appropriate for the application. It is noted that Ge can be used to make a diode-based energy conversion layer 10 much in the same way that GaN is used to make a diode-based energy conversion layer 10.

Accordingly, an example betavoltaic power source 6 can include an isotope layer 20 (e.g., a (139)Ta isotope layer) for long life, and Ge-based diodes as the energy conversion layers 10 to convert the energy from the isotope layers 20 into electricity. Note, however, that that the Ge-based material making up the diode embodiment of energy conversion layer 10 can also be an isotope (e.g., (68)Ge) that creates its own electricity. This configuration allows for twice as many layers that generate energy and thus generate twice as much power as GaN diode-based configurations. This configuration also maximizes the use of available space.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A betavoltaic power source that generates electrical energy for a transportation device, comprising:
   a plurality of isotope layers, each isotope layer including an isotope that emits radiation having energy, and wherein each isotope in the isotope layers is selected from the group of isotopes comprising: (3)H, (194)Os, (228)Ra, (155)Eu, (147)Pm, (171)Tm, (172)Hf, (179)Ta, (109)Cde, (106)Ru, (68)Ge, (195)Au, (45)Ca, (139)Ce and (181)W; and
   a plurality of energy conversion layers interposed between some or all the isotope layers and that receive and convert the energy from the radiation into the electrical energy to power the transportation device, wherein the plurality of isotope layers and the plurality of energy conversion layers define a stack having a perimeter;
   a plurality of continuous cooling conduits defined by thermally conducting rods that reside inboard of the perimeter and that pass through the stack so that heat generated within the stack is drawn out of the stack through ends of the rods; and
   wherein the amount of electrical energy generated is at least 100 W.

2. The betavoltaic power source according to claim 1, wherein the energy conversion layers comprise GaN.

3. The betavoltaic power source according to claim 1, wherein the energy conversion layers each have a thickness of about 10 microns to 20 microns.

4. The betavoltaic power source according to claim 1, further comprising a radiation-absorbing shield operably arranged to prevent the beta particles, x-rays and gamma rays from exiting the betavoltaic power source.

5. The betavoltaic power source according to claim 1, wherein adjacent isotope and energy conversion layers define layer pairs and wherein the betavoltaic power source includes between 500 and 10,000 layer pairs.

6. The betavoltaic power source according to claim 1, wherein the isotope layers are made of the same isotope material.

7. The betavoltaic power source according to claim 1, further comprising the transportation device electrically connected to the betavoltaic power source.

8. A betavoltaic power source that generates electrical energy for use by a transportation device, comprising:
   a plurality of isotope layers, with each isotope layer comprising an isotope material that emits radiation having an amount of energy that is greater than 15 keV and less than 200 keV, and a half-life that is between 0.5 years and 5 years; and
   a plurality of energy conversion layers interposed between some or all the isotope layers and that receive and convert the amount of energy from the radiation into the electrical energy which generates no less than 100 watts to power the transportation device.

9. The betavoltaic power source according to claim 8, wherein one or more of the energy conversion layers have a diode structure.

10. The betavoltaic power source according to claim 9, wherein the diode structure includes either GaN or Ge.

11. The betavoltaic power source according to claim 10, wherein the Ge comprises (68)Ge.

12. The betavoltaic power source according to claim 8, wherein adjacent isotope and energy conversion layers define layer pairs, and wherein the betavoltaic power source includes between 500 and 10,000 layer pairs.

13. The betavoltaic power source according to claim 8, wherein the isotope layers are formed from the same isotope material.

14. The betavoltaic power source according to claim 8, wherein the radiation includes at least one of beta particles, x-rays and gamma rays.

15. The betavoltaic power source according to claim 8, further comprising the transportation device electrically connected to the betavoltaic power source.

16. The betavoltaic power source according to claim 8, further comprising a battery electrically connected to the betavoltaic power source.

17. A transportation device electrically connected to the betavoltaic power source according to claim 8.

18. The betavoltaic power source according to claim 8, wherein each isotope in the isotope layers is selected from the group of isotopes comprising: (3)H, (194)Os, (228)Ra, (155)Eu, (147)Pm, (171)Tm, (172)Hf, (179)Ta, (109)Cd, (106)Ru, (68)Ge, (195)Au, (45)Ca, (139)Ce and (181)W.

19. The betavoltaic power source according to claim 8, wherein the plurality of isotope layers and the plurality of energy conversion layers define a stack having a perimeter, and wherein the betavoltaic power source further comprises:
   a plurality of continuous cooling conduits defined by thermally conducting rods that reside inboard of the perimeter and that pass through the stack so that heat generated within the stack is drawn out of the stack through ends of the rods.

* * * * *